(12) United States Patent
Sahu et al.

(10) Patent No.: US 10,358,230 B2
(45) Date of Patent: Jul. 23, 2019

(54) THERMAL ARM FOR DRONE

(71) Applicant: QUALCOMM Incorporated, San Diego, CA (US)

(72) Inventors: Vivek Sahu, San Diego, CA (US); Mehdi Saeidi, San Diego, CA (US); Rajat Mittal, San Francisco, CA (US); Melika Roshandell, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 15/263,267

(22) Filed: Sep. 12, 2016

(65) Prior Publication Data

US 2018/0072431 A1 Mar. 15, 2018

(51) Int. Cl.
*B64D 33/08* (2006.01)
*B64C 39/02* (2006.01)
*B64D 27/24* (2006.01)

(52) U.S. Cl.
CPC ............ *B64D 33/08* (2013.01); *B64C 39/024* (2013.01); *B64D 27/24* (2013.01); *B64C 2201/027* (2013.01); *B64C 2201/042* (2013.01); *B64C 2201/108* (2013.01); *Y02T 50/44* (2013.01)

(58) Field of Classification Search
CPC .. B64C 39/024; B64C 2201/042; B64D 33/08
See application file for complete search history.

(56) References Cited

U.S. PATENT DOCUMENTS

| 6,868,314 | B1 * | 3/2005 | Frink | B64C 1/00 |
| | | | | 701/3 |
| 7,338,010 | B2 * | 3/2008 | Corder | B64C 3/56 |
| | | | | 244/3.24 |
| 8,123,460 | B2 * | 2/2012 | Collette | B64C 39/024 |
| | | | | 361/679.47 |
| 2012/0056041 | A1 * | 3/2012 | Rhee | B64C 25/32 |
| | | | | 244/4 R |
| 2013/0062457 | A1 * | 3/2013 | Deakin | B64B 1/08 |
| | | | | 244/25 |
| 2014/0061376 | A1 | 3/2014 | Fisher et al. | |
| 2016/0090184 | A1 * | 3/2016 | Ghoshal | B60L 8/003 |
| | | | | 416/170 R |
| 2016/0129998 | A1 * | 5/2016 | Welsh | B64C 39/024 |
| | | | | 244/12.3 |
| 2016/0130015 | A1 | 5/2016 | Caubel et al. | |
| 2016/0305367 | A1 * | 10/2016 | Ghoshal | H01L 35/30 |
| 2018/0170535 | A1 * | 6/2018 | Sato | B64C 27/08 |

* cited by examiner

*Primary Examiner* — Philip J Bonzell
*Assistant Examiner* — Tye William Abell
(74) *Attorney, Agent, or Firm* — Seyfarth Shaw LLP (57) ABSTRACT

A drone adapted for flight may include propellers that may be powered by motors to move the drone. The drone may include a processing component and arms for supporting each of the propellers. At least a portion of at least one of the arms may include a first thermal spreading material that is coupled to the processing component. Each of the arms may be exposed to the air.

14 Claims, 5 Drawing Sheets

THERMAL ARM FOR DRONE

BACKGROUND

Field

Certain aspects of the present disclosure generally relate to drones and, more particularly, to systems and methods for cooling a drone.

Background

Drones are becoming increasingly popular for everyday use. Their ability to maneuver through air with precision makes drones ideal for many applications, including everything from package delivery to aerial photography. As drone capability increases, however, so does their power consumption. These various applications involve extending a flight time of the drones.

In operation, ninety percent (90%) of the battery power is used to lift and move the drone. As a result, ensuring sufficient flight time for the drone involves increasing battery power and capacity as well. The increased demand for more functionality and higher performance leads to increased heat generation by the battery.

If the drone overheats, it may cause decreased drone performance, thermal damage to the drone's components, and, ultimately, malfunctioning of the drone. Current methods of cooling drones involve using powered fans, which themselves produce heat. The fans also consume power, which reduces the flight time. Thus, it is desirable to provide a drone with improved thermal dissipation properties to prevent drone failure and improve performance that overcomes the shortcomings described above.

SUMMARY

A drone adapted for flight may include propellers that may be powered by motors to move the drone. The drone may include a processing component and arms for supporting each of the propellers. At least a portion of at least one of the arms may include a first thermal spreading material that is coupled to the processing component. Each of the arms may be exposed to the air.

A method for thermally cooling a drone that is adapted for flight may include coupling the drone's arms to a processing component. At least a portion of at least one of the arms may include a first thermal spreading material that is coupled to the processing component. Each of the arms may be exposed to the air. The method may further include attaching to the arms propellers that are each powered by a motor to move the drone.

An apparatus for thermally cooling a drone that is adapted for flight may include propellers that may be powered by motors to move the drone. The apparatus may include a processing component and arms for supporting each of the propellers. At least a portion of at least one of the arms may include means for dissipating heat from the processing component. Each of the arms may be exposed to the air.

This has outlined, rather broadly, the features and technical advantages of the present disclosure in order that the detailed description that follows may be better understood. Although the various aspects are directed to drone devices, the various aspects are not limited to drone devices, and other devices such as a mobile device or a robotic device are also contemplated. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts, it will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Aspects of the present disclosure involve a thermodynamic mechanical design that replaces an arm of a drone with a thermal spreader material to provide enhanced thermal compensation for heat generated by a processing element of the drone. The thermal spreader may also function as a mechanical structure, such as an arm of the drone. For example, the arm may be composed of a hybrid material including a conductive spreader material (e.g., aluminum (Al)) and a nonconductive material (e.g., plastic) to reduce weight, while improving thermal dissipation for the drone. According to aspects of the present disclosure, the hybrid arm extends a flight time of the drone by dissipating heat generated to operate the drone.

Figure 1:
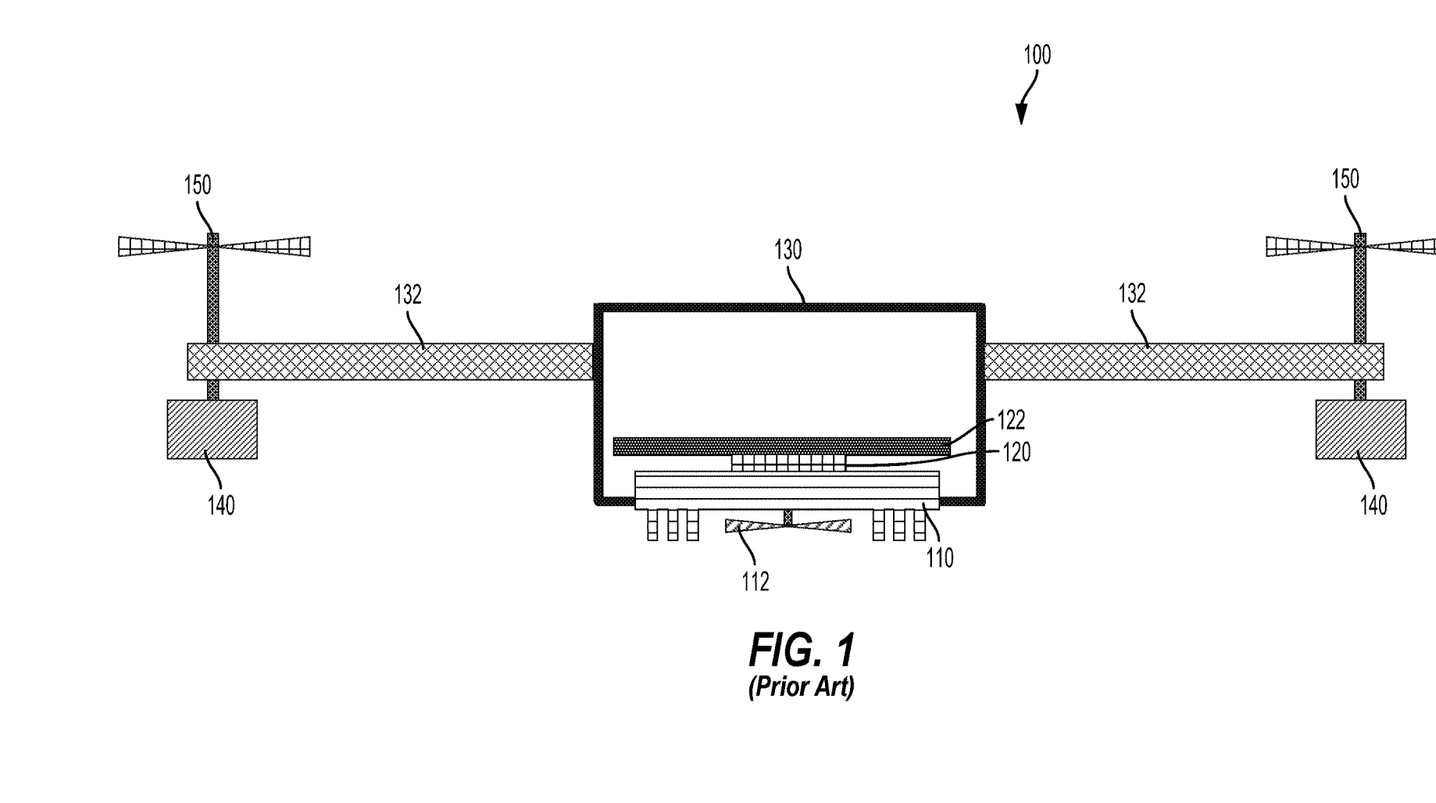
FIG. 1 illustrates a cross-sectional side view of a conventional drone.

FIG. 1 illustrates a drone 100. The drone 100 includes a heat sink 110 coupled to a chip 120. The chip 120 is coupled to a system board 122 (e.g., a printed circuit board (PCB)). Heat generated by the chip 120 is absorbed by the heat sink 110 and dissipated into the air below the drone 100. A fan 112 is included to cool the heat sink 110 for allowing faster cooling.

The drone 100 further includes a chassis 130 with arms 132 coupled to propellers 150. The propellers 150 are powered by motors 140. The chassis 130 supports the heat sink 110, the chip 120, and the system board 122.

A problem with the drone 100 is that the heat sink 110 can be heavy and adds weight to the drone 100. The added weight requires more power to mobilize the drone 100, which leads to increased heat generation. Additionally, the fan 112 generates heat and adds weight to the drone 100. The fan 112 can also cause unwanted vibrations and produce noise, which can disrupt the drone's functionality. Thus, it is desirable to provide a drone with improved thermal dissipation properties to prevent drone failure and improve performance that overcomes at least these described shortcomings.

Figure 2:
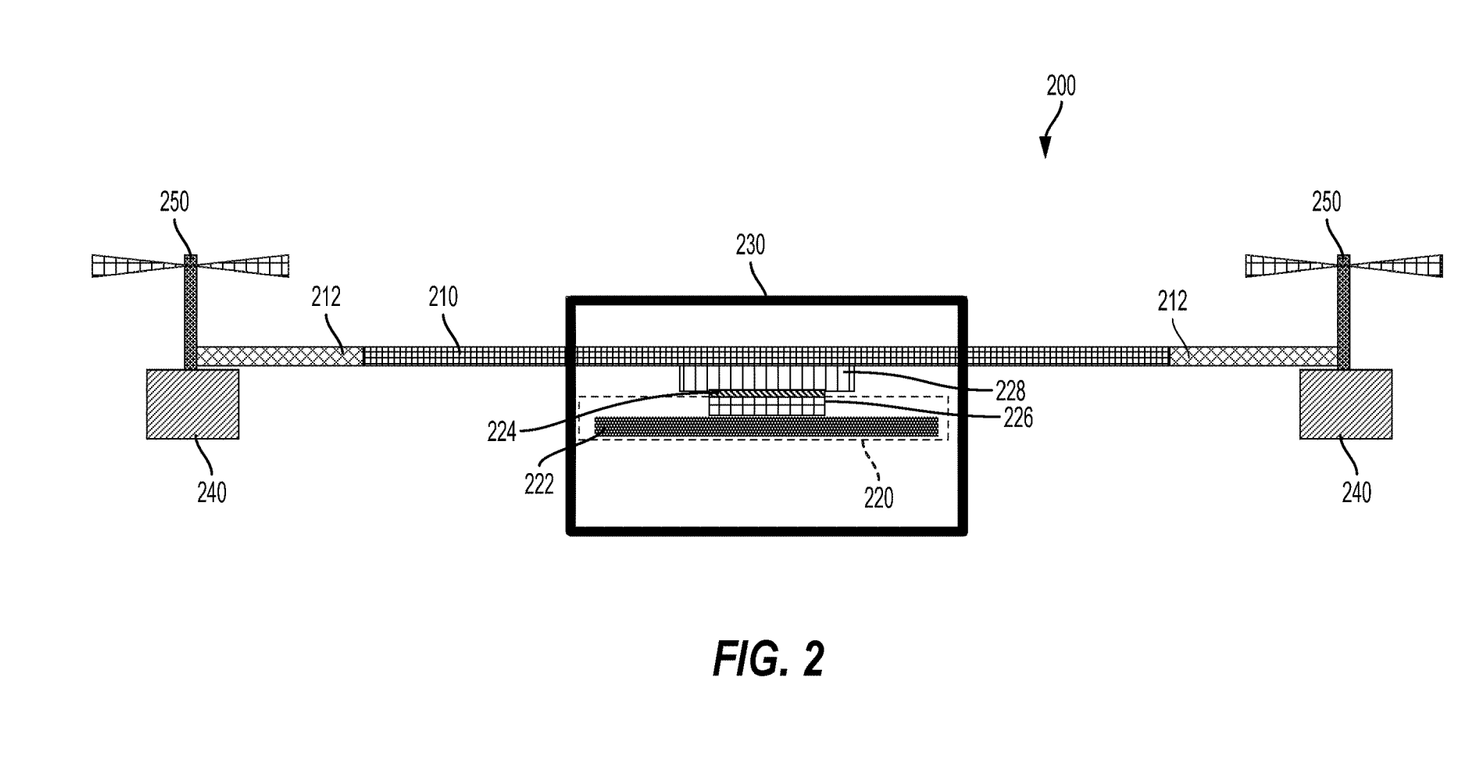
FIG. 2 illustrates a cross-sectional side view of a drone with a thermal arm according to aspects of the present disclosure.

FIG. 2 illustrates an example of a drone 200 adapted for flight according to an aspect of the present disclosure. As shown in FIG. 2, the drone 200 includes a thermal arm 210 coupled to a processing component 220. The processing component 220 may include a chip 226 mounted to a printed circuit board (PCB) 222 for controlling the drone 200. The processing component 220 may further include additional elements such as, but not limited to, transceivers, sensors, cameras, batteries, etc. The processing component 220 may be coupled to a conductive portion of the thermal arm 210 through a thermal interface material 224 and a thermal spreader 228. Non-limiting examples of the thermal interface material 224 includes thermal gap pads, thermal grease, thermal tapes and adhesives, and/or phase change materials (PCM), and the like. Non-limiting examples of the thermal spreader 228 includes high thermal conductivity materials such as aluminum, copper, graphite, vapor chambers, etc. According to an aspect of the present disclosure, the thermal spreader 228 is coupled to the thermal arm 210, the thermal interface material 224 is coupled to the thermal spreader 228, and the processing component 220 is coupled to the thermal interface material 224. Alternatively, the thermal arm 210 may be coupled directly to the processing component 220 through the thermal interface material 224.

In operation, the majority of heat may be generated by the processing component 220, and specifically, by the chip 226. Coupling the thermal arm 210 to the processing component 220 facilitates dissipation of heat generated by the processing component 220 without adding weight to the drone 200. This is because the thermal arm 210 replaces the separate fan and/or heat sink, which otherwise add weight to the drone 200 and drains the battery. Additionally, because the thermal arm 210 does not consume power, a smaller battery can be used, which in turn generates less heat and further improves thermal characteristics for the drone 200. The thermal arm 210 also does not cause any undesirable vibration or noise, and is durable.

The thermal arm 210 may be composed of a first thermal spreading material (e.g., a heat conductive material) for dissipating heat from the processing component 220. For example, the first thermal spreading material may be a highly thermal conductive material such as vapor chambers, aluminum, copper, graphite, and/or another like conductive alloy. Additionally, at least a portion of the thermal arm 210 may be a heat pipe for dissipating heat. The first thermal spreading material may be applied as a thermal coating onto the thermal arm 210, to reduce weight of the drone 200.

According to an aspect, the processing component 220 is housed within a housing 230 for protection from external environmental conditions. In this configuration, a portion of the thermal arm 210 extends through the housing 230 such that the portion of the thermal arm 210 within the housing 230 is coupled to the processing component 220. The rest of the thermal arm 210 extends outside the housing 230 and is exposed to the air for cooling. Heat generated by the processing component 220 is thus dissipated outside the housing 230 on the portion of the thermal arm 210 that is exposed to the air. The housing 230 may be shaped to improve aerodynamic characteristics of the drone 200 to reduce drag. For example, the housing 230 may be a cage, or may be smooth and contoured in shape. Reducing drag reduces the amount of power to move the drone 200, which also reduces heat generation.

According to an additional aspect, the thermal arm 210 further includes a nonconductive portion 212 (e.g., plastic) at an end supporting a propeller 250 for mobilizing the drone 200. For example, the thermal arm 210 extends outward and away from the housing 230, such that a length of the thermal arm 210 is sufficient for dissipating heat prior to reaching the nonconductive portion 212. The nonconductive portion 212 may be shorter than the thermal arm 210, and may be ½, ⅓, or ¼ a length of the thermal arm 210. These are examples only, and do not limit the possibility of other lengths. The thermal arm 210 may be attached to the nonconductive portion 212 through a heat resistive paste or connector.

The nonconductive portion 212 may further be coupled to the propeller 250. The propeller 250 may also be coupled to a motor 240 for moving the drone 200. Heat generated by the motor 240 may be cooled by the propeller 250. As such, the nonconductive portion 212 further reduces the weight of the drone 200 because the entire length of the thermal arm 210 is not conductive. The nonconductive portion 212 may further function to offset any vibration produced from the propeller 250 or motor 240. Reducing vibration improves the drone's performance.

Figure 3:
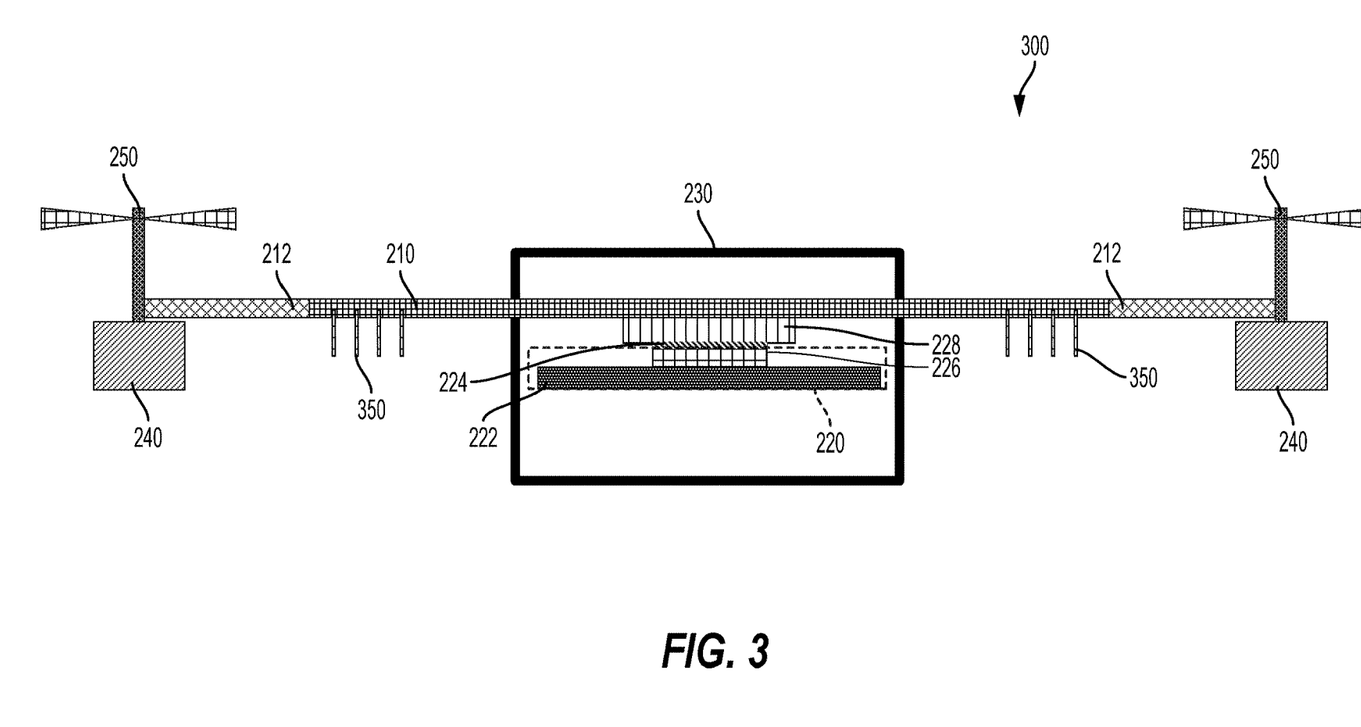
FIG. 3 illustrates a cross-sectional side view of a drone with a thermal arm according to additional aspects of the present disclosure.

FIG. 3 illustrates an example of a drone 300 adapted for flight according to additional aspects of the present disclosure. As shown in FIG. 3, the drone 300 includes all the elements of the drone 200 in FIG. 2, and additionally includes at least one thermal fin coupled 350 to the thermal arm 210. The thermal arm 210 may be composed of a first thermal spreading material while the thermal fin 350 may be composed of a second thermal spreading material. The first thermal spreading material and the second thermal spreading material may be the same or different. For example, the first and second thermal spreading materials may be a highly thermal conductive material such as vapor chambers, aluminum, copper, graphite, and/or other such metal alloys. The thermal fin 350 improves the heat dissipation properties of the thermal arm 210 by providing a larger surface area for heat to dissipate. The thermal fin 350 can be made of aluminum, copper, or other high thermal conductivity material.

The thermal fin 350 may be a flat fin, pin fin, rotating fin, or other fin types. The fin types listed are exemplary and non-limiting. An advantage of a pin fin is that its drag is the same regardless of a direction change or a direction of travel for the drone 300 (e.g., neutral drag). Alternatively, at least one rotating fin may be attached via at least one thermal hinge to the thermal arm 210 such that it can change direction based on an airflow direction while also thermally dissipating heat. The thermal fin 350 may be coupled to a portion of the thermal arm 210 that is exposed to the air. The thermal fin 350 may also be coupled in groups of at least two thermal fins.

Additionally, the size and shape of each thermal arm 210, each thermal fin 350, the housing 230, each propeller 250, and each motor 240 may be designed to account for weight and aerodynamic considerations. For example, each thermal arm 210 may be thin to reduce weight and drag of the drone 200, 300.

Figure 4:
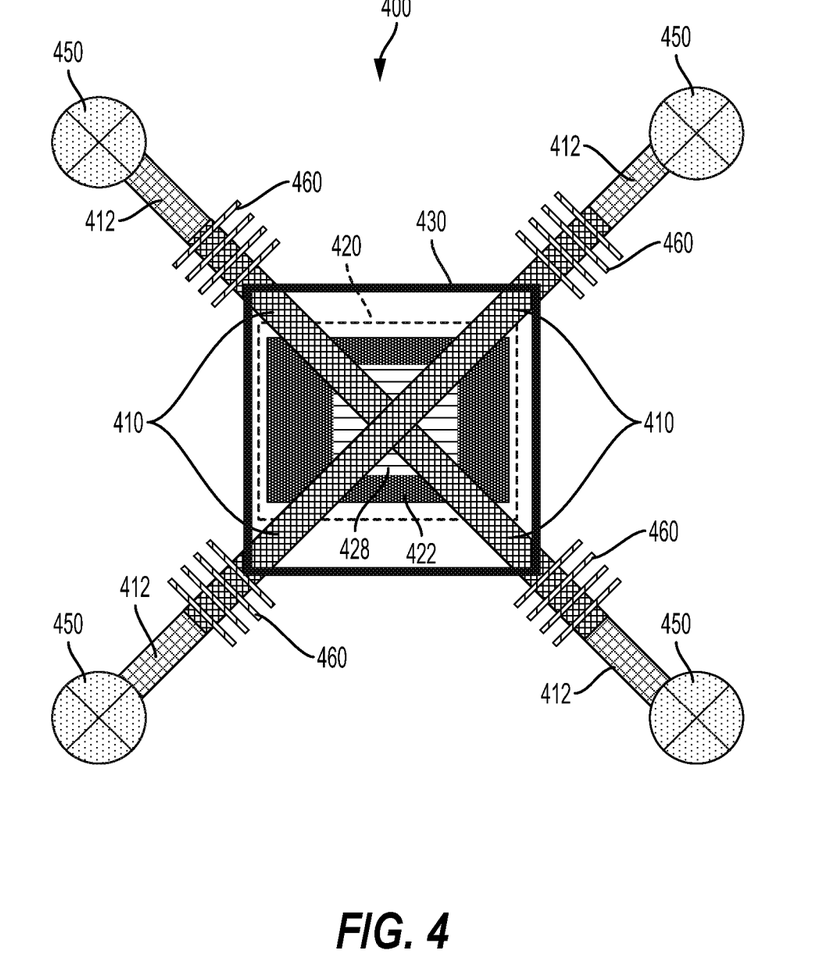
FIG. 4 illustrates a top view of a drone with a thermal arm according to aspects of the present disclosure.

FIG. 4 illustrates a top view of a drone 400 adapted for flight according to aspects of the present disclosure. The drone 400 may include propellers 450 that are each powered by a motor to move the drone 400. The drone 400 may further include arms 410 (e.g., thermal arms), each of the arms 410 supporting one of the propellers 450. At least a portion of one of the arms 410 may include a first thermal spreading material that is coupled to a chip (not shown) through a thermal spreader 428 supported by a printed circuit board (PCB) 422 (e.g., a processing component).

The PCB 422 may be coupled to the arms 410 through the thermal spreader 428. The thermal spreader 428 may be wider than the arms 410 in order to increase thermal dissipation from the PCB 422. As disclosed, the thermal spreader 428 may be coupled to a chip on the PCB 422 through a thermal interface material. Non-limiting examples of the thermal interface material includes thermal gap pads, thermal grease, thermal tapes and adhesives, and/or phase change materials (PCM), and the like. Non-limiting examples of the thermal spreader 428 includes high thermal conductivity materials such as aluminum, copper, graphite, vapor chambers, etc. Additionally, each of the arms 410 may be exposed to the air for cooling.

According to an aspect, a processing component 420 is housed within a housing 430 for protection from external environmental conditions. In this configuration, at least a portion of the arms 410 extend through the housing 430 and intersect with each other. For example, as shown in FIG. 4, the four arms 410 intersect in an "X" shape. Other combinations of arms is also possible. For example, three arms may intersect in a "Y" shape, and more or less arms may accordingly intersect in other configurations as well. The portion of the arms 410 that intersect within the housing 430 is coupled to the processing component 420. Heat generated by the processing component 420 is thus dissipated outside the housing 430 on a portion of the arms 410 that are exposed to the air. The housing 430 may be shaped to improve aerodynamic characteristics of the drone 400 to reduce drag. For example, the housing 430 may be a cage, or may be smooth and contoured in shape. Reducing drag reduces the amount of power to move the drone 400, which also reduces heat generation.

According to an additional aspect, the drone 400 may include fins 460 (e.g., thermal fins) coupled to the arms 410. The fins 460 may be composed of a second thermal spreading material. The first thermal spreading material and the second thermal spreading material may be the same or different. For example, the second thermal spreading material may be a highly thermal conductive material such as vapor chambers, aluminum, copper, graphite, and/or other such metal alloys. The fins 460 may be flat fins, pin fins, rotating fins, or other fin types. The fin types listed are exemplary and non-limiting. An advantage of a pin fin is that has a neutral drag regardless of a direction of the drone 400. Alternatively, rotating fins may be attached via thermal hinges to the arms 410 such they can change direction based on an airflow direction while also thermally dissipating heat.

The fins 460 may be coupled to a portion of the arms 410 that is exposed to the air. The fins 460 may also be coupled in groups of at least two fins. The fins 460 improve the heat dissipation properties of the arms 410 by providing a larger surface area for heat to dissipate.

According to another aspect, the arms 410 each may further include a nonconductive portion 412 at an end supporting one of the propellers 450. For example, the arms 410 may extend outwardly and away from the housing 430, such that a length of the arms 410 is selected to dissipate heat prior to reaching the nonconductive portion 412. A length of each nonconductive portion 412 may be selected to be shorter than the arms 410, and may be ½, ⅓, or ¼ of the length of the arms 410. These are examples only, and do not limit the possibility of other lengths. The arms 410 may be attached to the nonconductive portion 412 through a heat resistive paste or connector. As such, the nonconductive portion 412 further reduces the weight of the drone 400 because the entire length of the arms 410 is not conductive.

Each nonconductive portion 412 may be coupled to one of the propellers 450 for moving the drone 400. The propellers 450 may further be coupled to a motor for moving the drone 400. Heat generated by the motor may be cooled by one of the propellers 450. In some cases, some arms 410 may not include a nonconductive portion 412, and the nonconductive portion 412 may not be coupled to one of the propellers 450. The nonconductive portion 412 may further function to offset any vibration that may be produced from one of the propellers 450 or the motors.

Additionally, the size and shape of the arms 410, the fins 460, the housing 430, the propellers 450, and the motors may be designed to account for weight and aerodynamic considerations. For example, the arms 410 may be thin to reduce weight and drag of the drone 400.

According to additional aspects, a different number of arms 410 may be used. For example, a single one of the arms 410 may be coupled to a single one of the propellers 450 and the motor. Alternatively, any number of arms 410 from at least two to four or more may be used. Each of the arms 410 may be coupled to one of the propellers 450, or there may be fewer of the propellers 450 than the arms 410. In one aspect, a single one of the arms 410 has a single one of the propellers 450 located centrally above the PCB 422 and chip. In another aspect, each of the arms 410 may include multiple ones of the nonconductive portion 412, or may be completely conductive. Additionally, the fins 460 may be spaced on a metal portion of the arms 410. The fins 460 may be included on some arms 410 while being omitted from other ones of the arms 410.

Figure 5:
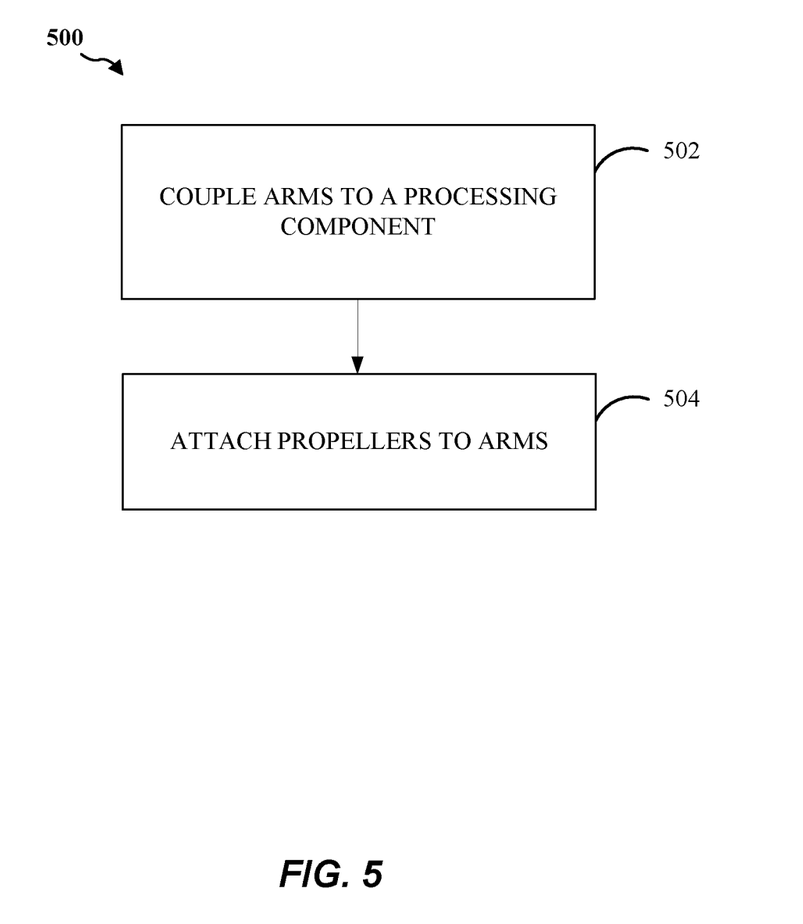
FIG. 5 illustrates a flow diagram for cooling a drone with a thermal arm according to an aspect of the present disclosure.

FIG. 5 illustrates a flow diagram 500 of a method for thermally cooling a drone that is adapted for flight in accordance with aspects of the present disclosure. As shown in block 502, arms (e.g., thermal arms) are coupled to a processing component. At least a portion of at least one of the arms may be composed of a first thermal spreading material that is coupled to the processing component. The processing component may include a chip mounted to a printed circuit board (PCB). A thermal interface material may couple the thermal spreading material to the chip. Each arm may be exposed to the air for cooling. According to additional aspects, the processing component is housed within a housing structure. At least a portion of at least one of the arms may extend through the housing.

As shown in block 504, propellers are attached to the arms. The propellers may be attached to and powered by motors for moving the drone. The arms each may further include a plastic portion at an end supporting the propeller. For example, the arms may extend outwardly and away from the housing, such that the arms are long enough for the heat to be dissipated to the air prior to reaching the plastic portion. The plastic portion may be shorter than the arm, and may be ½, ⅓, or ¼ a length of the arm. These are examples only, and do not limit the possibility of other lengths. The arm may be attached to the plastic portion through a heat resistive paste or connector.

According to an additional aspect, the drone further includes at least one fin (e.g., thermal fin) coupled to the arms. The fin may be composed of a second thermal spreading material. The first thermal spreading material and the second thermal spreading material may be the same or different. For example, the second thermal spreading material may be a highly thermal conductive material such as aluminum, copper, graphite, and/or other such metal alloys. The fin may be a flat fin, pin fin, rotating fin, or other fin types. The fin types listed are exemplary and non-limiting. Alternatively, rotating fins may be attached via thermal hinges to the arms such they can change direction based on an airflow direction while also thermally dissipating heat.

The fin may be coupled to a portion of the arms that is exposed to the air. The fin may also be coupled in groups of at least two fins. The fin improves the heat dissipation properties of the arms by providing a larger surface area for heat to dissipate.

According to an aspect of the present disclosure, a thermal solution for cooling a drone is described. The drone may include propellers powered by motors to move the drone and a processing component. The drone also includes arms, each supporting one of the propellers. At least a portion of at least one of the arms includes means for dissipating heat from the processing component, in which each of the arms is exposed to air. The heat dissipating means may be the thermal interface material 224 and thermal spreader 228, as shown in FIG. 2. In another aspect, the aforementioned means may be any module or any apparatus or material configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a non-transitory computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A drone adapted for flight, comprising:
    a plurality of propellers powered by a plurality of motors to move the drone;
    a processing component, comprising an integrated circuit mounted to a board on a first side and a thermal interface material on a second side opposite the first side;
    a thermal spreader directly on the thermal interface material;
    a plurality of arms each supporting one of the plurality of propellers, a portion of each of the plurality of arms comprising a first thermal spreading material is-coupled to the processing component through the thermal spreader and the thermal interface material, each of the plurality of arms exposed to air; and
    a housing structure enclosing the processing component, the portion of one of the plurality of arms comprising the first thermal spreading material extending through the housing structure and intersecting with the portion of a second one of the plurality of arms, both directly on an exposed surface of the thermal spreader within the housing structure.

2. The drone of claim 1, in which the board comprises a printed circuit board (PCB).

3. The drone of claim 1, in which the portion of the plurality of arms comprises a heat pipe.

4. The drone of claim 1, further comprising a thermal spreader between the first thermal spreading material of the plurality of arms and the processing component.

5. The drone of claim 1, in which the first thermal spreading material comprises a thermal conductive material.

6. The drone of claim 5, in which the thermal conductive material includes aluminum, copper, graphite, and/or a conductive alloy.

7. The drone of claim 1, further comprising a fin coupled to the first thermal spreading material of the plurality of arms, the fin comprising a second thermal spreading material.

8. The drone of claim 7, in which the fin comprises a flat fin.

9. The drone of claim 7, in which the first thermal spreading material and the second thermal spreading material are the same.

10. The drone of claim 7, in which the first thermal spreading material and the second thermal spreading material are different.

11. A method for thermally cooling a drone that is adapted for flight, comprising:
    coupling a plurality of arms to a processing component through a thermal spreader and a thermal interface material on a side of the processing component, a portion of each of the plurality of arms comprising a first thermal spreading material that is coupled to the processing component through the thermal spreader and the thermal interface material, each of the plurality of arms exposed to air;
    attaching the plurality of arms to a plurality of propellers powered by a plurality of motors to move the drone; and
    enclosing the processing component within a housing structure, the portion of one of the plurality of arms comprising the first thermal spreading material extending through the housing structure and intersecting with the portion of a second one of the plurality of arms, both directly on an exposed surface of the thermal spreader within the housing structure.

12. The method of claim 11, further comprising selecting a length of a conductive portion of the plurality of arms, coupled to the processing component through the thermal spreader and the thermal interface material, to dissipate heat prior to reaching a nonconductive portion of the plurality of arms.

13. An apparatus for thermally cooling a drone that is adapted for flight, comprising:
    a plurality of propellers powered by a plurality of motors to move the drone;
    a processing component, comprising an integrated circuit mounted to a board on a first side and a thermal interface material on a second side opposite the first side;
    a thermal spreader directly on the thermal interface material;
    a plurality of arms each supporting one of the plurality of propellers, a portion of each of the plurality of arms comprising means for dissipating heat from the processing component through the thermal spreader and the thermal interface material, each of the plurality of arms exposed to air; and
    a housing structure enclosing the processing component, the portion of one of the plurality of arms comprising the means for dissipating heat extending through the housing structure and intersecting with the portion of a second one of the plurality of arms, both directly on an exposed surface of the thermal spreader within the housing structure.

14. The apparatus of claim 13, in which the board comprises a printed circuit board (PCB).

* * * * *